W. J. MILLER.
APPARATUS FOR MANUFACTURING ARTICLES OF GLASS.
APPLICATION FILED AUG. 11, 1917.

1,308,095.

Patented July 1, 1919.

W. J. MILLER.
APPARATUS FOR MANUFACTURING ARTICLES OF GLASS.
APPLICATION FILED AUG. 11, 1917.

1,308,095.

Patented July 1, 1919.
7 SHEETS—SHEET 5.

W. J. MILLER.
APPARATUS FOR MANUFACTURING ARTICLES OF GLASS.
APPLICATION FILED AUG. 11, 1917.

1,308,095.

Patented July 1, 1919.
7 SHEETS—SHEET 7.

UNITED STATES PATENT OFFICE.

WILLIAM J. MILLER, OF SWISSVALE BOROUGH, PENNSYLVANIA.

APPARATUS FOR MANUFACTURING ARTICLES OF GLASS.

1,308,095.  Specification of Letters Patent.  Patented July 1, 1919.

Application filed August 11, 1917. Serial No. 185,647.

*To all whom it may concern:*

Be it known that I, WILLIAM J. MILLER, a citizen of the United States, and residing in the borough of Swissvale, in the county of Allegheny and State of Pennsylvania, have invented or discovered new and useful Improvements in Apparatus for Manufacturing Articles of Glass, of which the following is a specification.

My invention consists of certain new and useful improvements in machines for forming articles of glass. I have illustrated my invention in the accompanying drawings as applied to a machine for forming pressed glass articles, but it will be understood that the same may be likewise applied to machines for blowing or for both pressing and blowing glass articles.

Generally speaking, my improved machine shows combined means for presenting a series of molds in turn to the glass supply means, the shearing means, the pressing or blowing, or both pressing and blowing means, and for dumping the completed glass product from its mold. Fluid pressure operated means, under control of the operator, are provided for actuating the various elements and mechanism of the machine.

Novel means are provided for intermittently rotating a mold table upon which the molds are supported. Novel means are also provided for reversing the molds after the forming operation for discharging the contents into a revolving sand box or other receptacle. Novel means are provided for locking the mold table stationary at the completion of each intermittent movement and also for automatically unlocking the table when the latter is to be again moved.

Novel means are also provided for effecting and controlling the elevation and descent of the pressing means, whereby the proper force, speed and range of movement of the pressing bit is obtained for forming the particular article being pressed, and means are also provided whereby the speed of the descent of the pressing bit is slowed down and the force increased as it enters the mold for the filling and pressing operation, to accomplish the same, is applied to the pressing plunger. Novel means are also provided for varying the height of the pressing mechanism to accommodate varying heights of molds mounted on the rotary table. Novel means are also provided for varying the degree of force exerted in the pressing operation so that articles, such as are pressed in tall molds and therefore require more force for filling and pressing, may be equally well manufactured on my improved machine as can articles made in shallow molds requiring but relatively slight pressing force. Novel means are also provided for centering the pressing plunger so that it will accurately enter the mold and accomplish the pressing operation.

Novel means are also provided for supporting the mold independently of the mold table during the pressing operation, thus preserving the mold table from strain and injury, and properly alining the mold with the pressing mechanism.

Many other novel features of construction and arrangement of mechanism appear in the following description:

In the accompanying drawings, which are merely intended to illustrate a practical embodiment of my invention without limiting the scope of the same to the construction shown.

The following is a detailed description of the drawings:

A is a casting which forms the bed or base frame of the machine, and which is supported by a fixed axle 1 having wheels 2, and a pivoted axle 1ᵃ having wheels 2ᵃ, the axle 1ᵃ being provided with an upwardly extending cylindrical stud 3 at its center which engages a vertical socket 4 in the bed A. Thus the machine may be conveniently moved from place to place, as desired.

B and C represent a pair of vertical standards of cylindrical shape and supported by the bed A. Thus the standard B may be stepped in a socket 5 in the bed, while the lower end of the standard C may extend down through a cylindrical collar 6 in said bed and be held rigidly therein by any convenient means, such as the set screw 7.

8 is a sleeve slipped over the standard C and supported in position above the bed A, as by the split ring 9 seated in a circumferential groove in said standard C.

10 is an annular depending bracket rigidly mounted on said sleeve 8 and provided with an annular ball raceway 11 for the antifriction members 12 upon which bears the lower end of the hub 13 of the mold table D, said hub being journaled on said bracket 10, as shown.

The table D is preferably an integral casting composed of the hub 13 from which radiate arms 14 whose outer ends merge into tangential bars 15 connected together at their ends, and from each of which tangential bars extend outwardly a pair of parallel mold carrying arms 16. 17 represents horizontal stiffening webs which occupy the angles between the arms 16 of adjacent pairs, and 18 are similar webs which connect together the members of each pair of arms 16 adjacent to their inner ends.

Adjacent to their outer ends said pairs of arms 16 are provided on their top edges with alined journal sockets 19 in which are journaled the pivot studs 20 extending from the opposite sides of the molds E.

Each mold is provided with a toothed sector 21 rigidly mounted concentrically with one of the pivot pins, and said sectors are provided with enlargements 22 which normally rest upon the webs 18 and hold the molds upright against inwardly tipping toward the axis of the mold table. To prevent the molds tipping outwardly, except when their product is to be dumped, the pivot studs 20 are offset from the center line of the molds toward the outer ends of arms 16, thus counterbalancing the molds inwardly and causing them to be supported in an upright position by the contact of the enlargements 22 with the webs 18.

Figure 1:
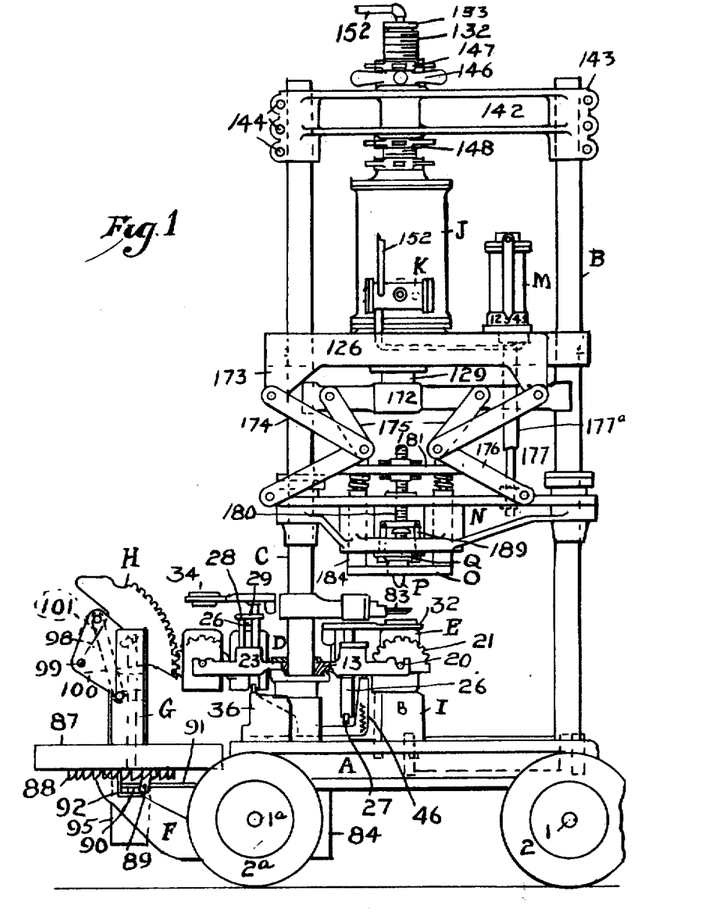
Figure 1 is a side elevation of a glass machine embodying my invention, the rotary mold table being partially broken away and the piping omitted for the sake of clearness.
Figure 2:
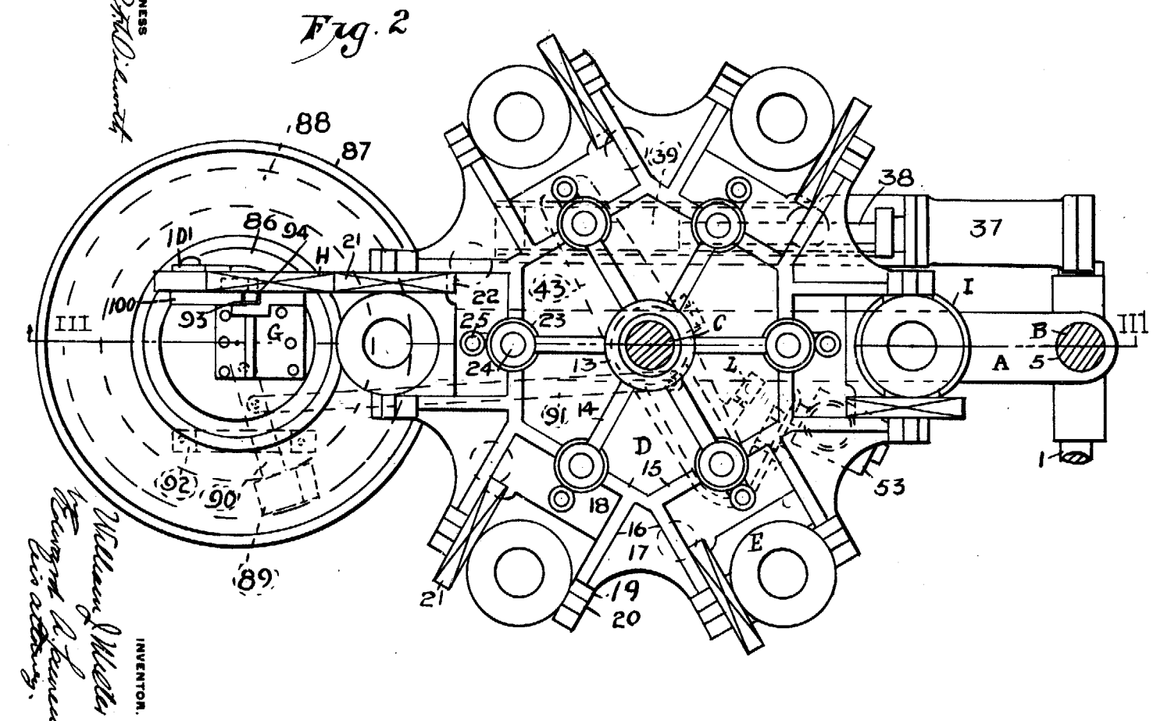
Fig. 2 is an enlarged plan view showing the means for intermittently rotating the mold table and sand box, the mold tops being omitted for the sake of clearness.

At the juncture of each of the radial arms 14 and the associated tangential bar 15 there is an enlargement 23 through which are provided the larger vertical bore 24 and the smaller vertical bore 25, said bores being alined with the axis of the table D and of the corresponding mold E, and the smaller bore being outside of the larger bore, as shown in Fig. 2. 26 is a cylindrical plunger sliding in the bore 24 and having at its lower end a roller 27 which is adapted to engage a cam track extending up from the table D. 28 is a smaller plunger sliding in the bore 25 and yoked to the upper end of plunger 26 by split clamp 29, thereby moving in unison with and preventing rotation of plunger 26 in the bore 24. 30 is a stem which is inserted in the bore of the plunger 26 and held at any desired elevation in the same by the clamp 29, the wall of the upper portion of said plunger 26 is split as at 31 to permit the clamping of the stem 30 rigidly in place. 32 is a horizontal arm fixed intermediate of its ends on the stem 30 and provided at its outer end with an eye or circular loop 33 in which is seated the mold top 34. The inner end of the arm 32 is provided with a counter weight 35. The mold top 34 is maintained in the same vertical plane as the mold E. 36 is a cam track carried by the base A and provided with an inclined forward portion, followed by a horizontal intermediate portion and ending in a relatively abrupt descent, as shown, the track being curved so as to be engaged by the rollers 27 as the table D revolves counter-clockwise, thus raising the mold tops out of engagement with their molds to enable the molds to be dumped for the discharge of the produce, and then permitting the mold tops to descend down into place on the molds for the gathering, shearing and pressing operations.

I will now proceed to describe the mechanism for rotating the mold table intermittently and for locking the same stationary between said movements.

37 is a pressure cylinder horizontally mounted on the bed A and whose piston rod 38 is connected to a slide 39 which moves in a suitable slideway in said bed. 40 is a pin extending upwardly from said slide and having pivotally mounted theron a block 41 which slides in a slot 42 undercut in the bottom face of the rocking bar 43. Said rocking bar is formed of two sections having at their adjacent ends semi-circular hub sections 44 which are attached together about the sleeve 8 by means of the bolts 45, whereby said rocking bar is pivotally mounted on the standard C. It is thus evident that said rocking bar will be swung counter-clockwise by the extension of the piston rod 38 and clockwise by the retraction of said piston rod.

The other end of the bar 43 is provided with a vertical cylindrical post 46 and a horizontal extension or bracket 47. The post 46 is vertically bored to receive a sliding bolt 48 which is provided at its lower end with a fixed radial pin 49 which protrudes through a vertical slot in the wall of the post. 50 is a helical spring whose lower end is connected to said pin and its upper end to a pin 51 extending from said post. The upper end of the bolt 48 is intended to seat in any one of an annular series of holes 52 on the under side of the table D, said holes being spaced apart a distance equal to the arc of movement through which said table is to be intermittently rotated. It is evident that the spring 50 will tend to seat the bolt in one of said holes and hold it therein, so that the counterclockwise swing of the bar 43 will serve to carry the table around with it to the limit of its stroke. On the return movement of the bar 43, the bolt will trail back along the under surface of the table until at the completion of the back swing of the bar, said bolt will encounter and seat in the next hole 52, ready to again rotate the table on the next forward swing of the bar 43.

53 is a casting secured on the bed A and provided with a vertically disposed piston chamber 54, closed at the bottom and open at the top, in which is mounted a piston 55 whose upper end is beveled and adapted to protrude to engage one of an annular series of sockets 56 on the under side of table D spaced apart a distance equal to the movement of the table during its intermittent rotation. Said casting is also provided with a slide valve chamber 57 closed at top and bottom and of less height than the chamber 54. 58 is a valve sliding in chamber 57. 59 is a pin fixed radially in the piston 55 and extending through a vertical slot in the casting 53. 60 is a latch arm having its upper end pivotally secured to the outer end of pin 59 and its lower end provided with a notch 61 adapted to engage a pin 62 extending from the casting, whereby the piston may be held in a retracted position out of engagement with the table D. 63 is a helical spring having its lower end attached to the lower end of arm 60 while its upper end is attached to the exterior wall of the casting, thereby tending to draw and hold the notch 61 of the latch arm 60 in engagement with the pin 62. 64 is a lever pivoted intermediate of its ends to the bracket 47 of the bar 43 and having one end pivotally connected to the pin 49 on the lower end of the bolt 48. The free end of the lever 64 is notched, as shown, to engage a pin 65 on the lower end of the latch arm 60, whereby as the bar 43 completes its forward stroke the notched end of the lever 64 will engage the pin 65 and release the said latch arm from the pin 62, thus permitting the piston 55 to rise and go into locking engagement with the table D thereby locking said table stationary. At the same time the upward movement of the latch arm 60 and its pin 65 will elevate the free end of the lever 64 and thus depress the bolt 48 out of engagement with the table, thereby permitting the bar 43 to rock rearwardly without moving the table with it, the bolt 48 trailing back along the under face of the table until, at the completion of the rearward movement of the bar 43, it encounters the next hole 52 of the table.

A vertical slot 66 connects the lower portions of the chambers 54 and 57 and provides clearance for a pin 67 radially fixed in the piston 55 and extending through said slot and having its outer end seated in a loosely fitting socket or hole in the slide valve 58, thereby flexibly coupling the piston and slide valve together.

The upper end of the valve chamber 57 is provided with a pressure inlet port 68, and 69 is a port in the bottom of said chamber. Below the level of said port 68, said chamber is provided with three vertically alined and equally spaced ports 70, 71 and 72. The slide valve 58 is provided with a vertical passage 73 extending down from its top and connected to a diametrical port 74 which, when the slide valve is raised, registers with the port 72 of the chamber. When the slide valve is depressed, the port 70 is in communication with the pressure port 68. The slide valve is also provided with a reduced or bleeder passage 75 extending down from the passage 73 to the bottom of the slide valve. Said slide valve is also provided with a recess 76 which, when the valve is depressed, connects the ports 71 and 72 of the chamber and, when said valve is raised, connects the ports 71 and 70 of said chamber.

A constant fluid pressure pipe 77 connects with the port 68 and a pipe 78 connects the port 69 with a pressure relief valve 79, placed convenient to the punty of the operator when he is placing a gather of glass in a mold. Thus the operator may relieve the pressure against the under side of the valve 58, thereby permitting the pressure against the top of said valve to force said valve and the piston 55 coupled thereto downwardly, thus unlocking the table D.

A pipe 80 connects the port 70 of the valve chamber with the rear end of the cylinder 37, while a pipe 81 leads from the port 72 to the front end of said cylinder 37. A branch pipe 80ᵃ connects the pipe 80 with the rear end of the cylinder 82 which operates the shears 83, while a branch pipe 81ᵃ connects the pipe 81 with the front end of said shears cylinder. The port 71 is open to atmosphere for the relief of pressure. The shear mechanism is shown supported by the standard C.

Thus, when the slide valve 58 is elevated and the piston 55 is in locking engagement with the table D, pressure is admitted through the passage 73, ports 74 and 72, and pipe 81 to the forward end of the cylinder 37, thus retracting the piston rod 38 and swinging the bar 43 clockwise, while the table remains stationary. At the same time pressure is admitted through the pipe 81ᵃ to the front end of the shear cylinder 82, thus causing the shears 83 to open. Simultaneously the pressure is relieved from the opposite ends of said cylinders through the pipe 80, the port 70, the recess 76 and the relief port 71. As has been explained, the elevation of the piston 55 results in the temporary retraction of the bolt 48 from engagement with the hole 52 which it has engaged during the forward swing of the bar 43 to rotate the table. Thus as the bar 43 swings rearwardly the table remains stationary while bolt 48 trails rearwardly along the under surface of the table until it engages the next hole 52.

Figures 7, 10:
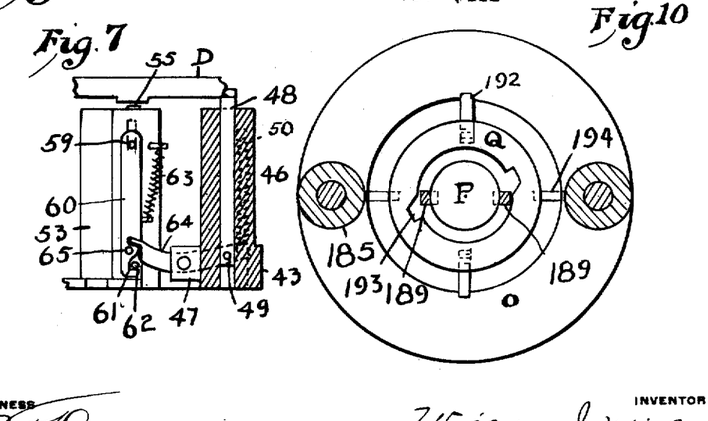
Fig. 7 is a view on enlarged scale taken and partially in section along the line VII—VII in Fig. 6, showing the table rotating and locking devices.
Fig. 10 is a view taken along the line X—X in Fig. 9 showing the floating chuck cam of the plunger.
Figures 8, 9:
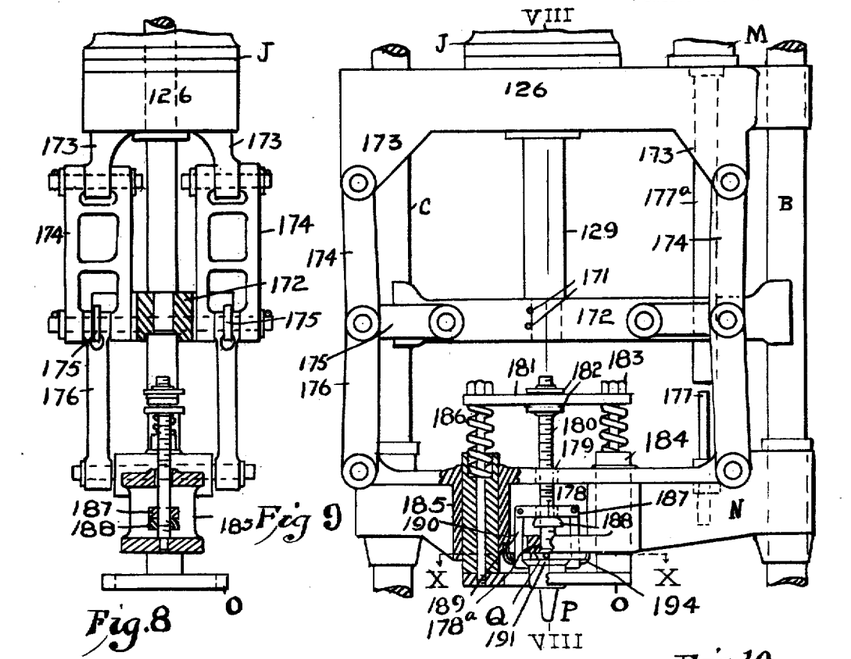
Fig. 8 is a view partly in section along the line VIII—VIII in Fig. 9, showing the pressing plunger mechanism.
Fig. 9 is a front elevation of the same, partially broken away in section for the sake of clearness.

When the operator opens the relief valve 79, the pressure is quickly relieved in the lower end of the chamber 57 because it permits the air to escape faster than the passage 73 can supply it, enabling the pressure in the upper portions of said chamber to depress the slide valve 58, carrying with it the piston 55, and thus unlocking the table. Said piston is then held in its retracted position by the engagement of the notch 61 of the latch arm 60 with the pin 62, as shown in Fig. 7. When the valve 58 is depressed, the ports 71 and 72 are connected by the recess 76 and the port 70 is in communication with the pressure ports 68. Thus pressure is admitted by the pipe 80 to the rear ends of the cylinders 37 and 82, and pressure is exhausted through the pipe 81, port 72, recess 76 and port 71, from the front ends of said cylinders. Thus the shears close and sever the neck of glass from the gather which the operator has placed in the mold, and the bar 43 is swung forwardly, counter-clockwise, thus rotating the table until once more the lever 64 throws loose the latch arm 60 and permits the piston 55 to rise into locking engagement with the next socket 56 of the table. The bleeder passage 75 permits a gradual equalizing of pressure at both ends of the slide valve and enables the pressure to accumulate under the piston 55 to elevate the piston 55 into locking position. This elevation is somewhat assisted by the spring 63. 55ᵃ represent circumferential oil grooves on said piston to retard the escape of pressure up along the same from the bottom of chamber 54.

The relief valve 79 is so located that when the operator places a gather of glass in one of the molds, his descending punty strikes and actuates said valve. The relief capacity of the valve 79 is greater than the supply capacity of the bleeder valve 75, so that pressure is exhausted from beneath the piston 55 and valve 58 at a faster rate than it is supplied through the bleeder passage 75.

F is a bracket, having a split socket 84 which is bolted around the lower end of the standard C below the bed A, extending out in front of the truck and provided with an integral horizontal circular plate 85 on which is secured an annular plate or sleeve 86. 87 is an annular sand box resting upon the plate 85 and having its axis journaled on the sleeve 86. Said box is partially filled with sand or other cushioning material, as shown, to receive the finished product dumped from the molds.

The under face of said box is provided with an annular concentric toothed rack 88 which is engaged by a pawl 89 mounted on the outer end of a swinging arm 90 whose inner end is pivoted to the bracket F. A rod 91 connects said arm 90 with the bar 43, so that they swing in unison. When the bar 43 moves forwardly and rotates the table D, the pawl 89 engages the rack 88 and turns the sand box 85, while a reverse movement of the bar 43 causes the pawl to trail back over the teeth of the rack without rotating the sand box in a reverse direction. 92 is a loop whose ends are attached to the bracket F and which passes underneath the arm 90 to hold the pawl in proper horizontal position.

G is a pedestal extending vertically from the plate 85 and provided with a vertical groove 93 in which slides the upper squared end of the piston rod 94 of a fluid pressure cylinder 95 mounted vertically on the bracket F. The upper end of said piston rod is provided with a wrist pin 96 which engages a slot 97 in the radial leg 98 of the toothed sector H whose center is pivoted by the bolt 99 to the bracket 100 of the pedestal G. 101 is a bar secured at its ends to the bracket 100 and spaced away therefrom to enable the sector to swing in proper alinement between said bar and the bracket.

Figure 3:
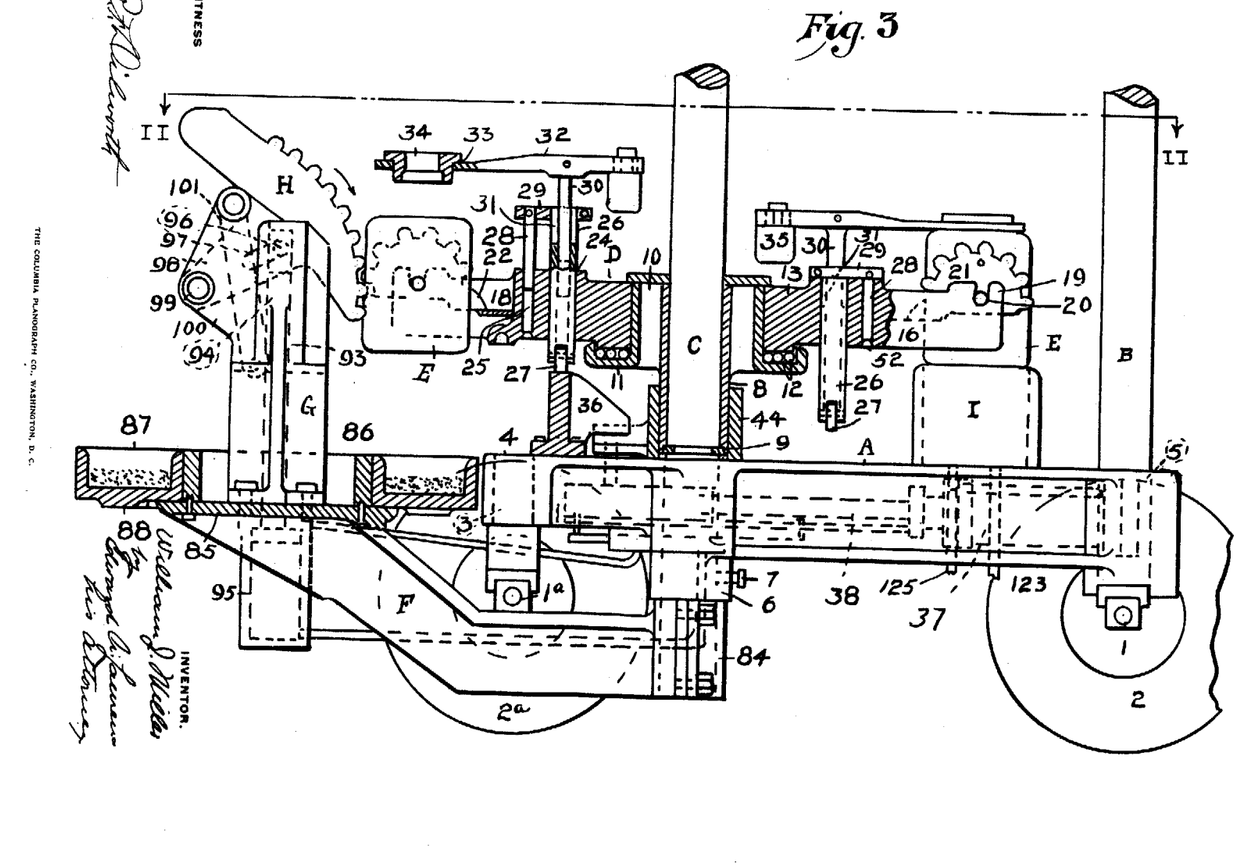
Fig. 3 is a longitudinal section taken along the line III—III in Fig. 2, and also showing the mold tops and their mounting.

The sector H is so positioned and alined that it will engage and mesh with the sector 21 of the mold E whose mold top 34 has been elevated out of the way, as shown in Fig. 3.

Figures 4, 5, 6:
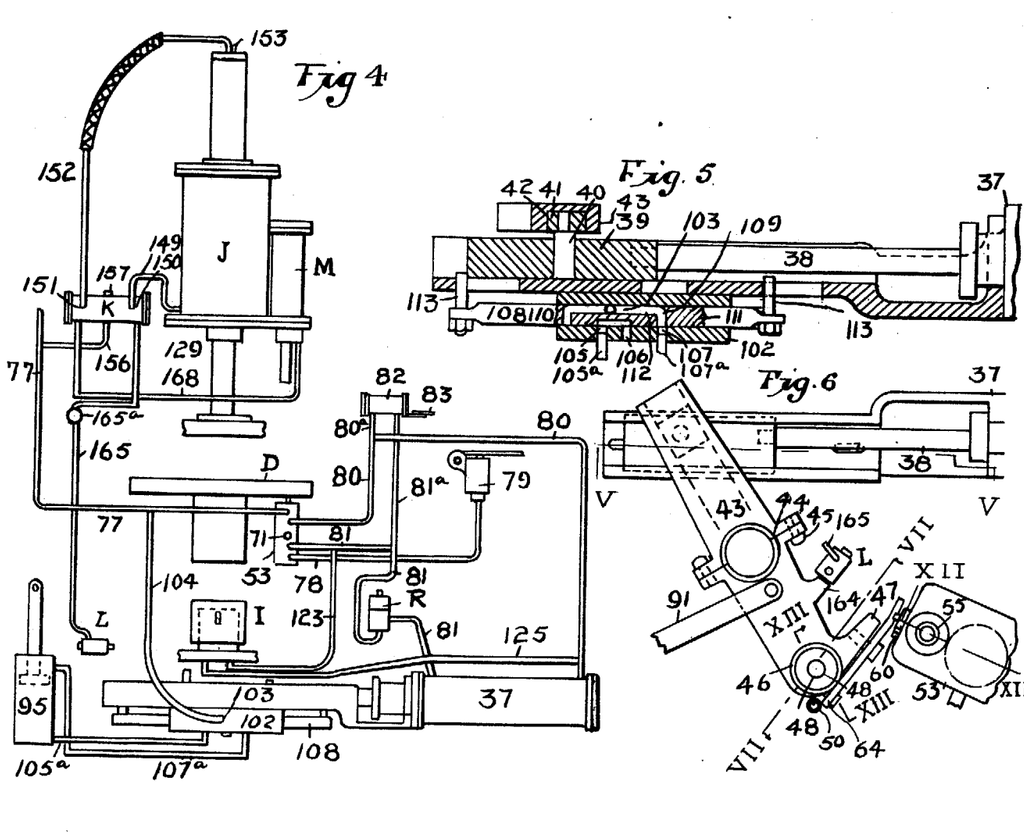
Fig. 4 is a diagrammatic view showing the arrangement of pipes and air valves.
Fig. 5 is a section taken along the line V—V in Fig. 6.
Fig. 6 is a plan view showing the mechanism for intermittently rotating the mold table and for locking the same stationary.

Referring now to Fig. 5, 102 is an open ended cylindrical valve casing secured to the under side of the bed A beneath the path of the slide 39. Said casing is provided with a central port 103 in its wall connected by a pipe 104 with the pressure pipe 77. Said casing is also provided with three ports 105, 106 and 107, equally distant apart and alined longitudinally of said casing. The port 105 is connected by a pipe 105ᵃ to the bottom of the cylinder 95, while the port 107 is connected by a pipe 107ᵃ with the top of the cylinder 95. The central port 106 is an exhaust port to atmosphere. 108 is a valve plug sliding in the casing 102 and provided with a recess 109 which is always in communication with the pressure port 103. Said plug is also provided with a pair of ports 110 and 111, leading from said recess diametrically through said plug. The plug is also provided with a recess 112 which connects the exhaust port 106 with either the port 105 or 107 according to the position of the valve plug 108. The ports are so positioned that when the port 107 is connected by the recess 112 with exhaust port 106, the port 110 connects the port 105 with the recess 109 and the pressure inlet port 103, and vice versa, when the recess 112 connects the port 105 with the exhaust port 106, the port 111 connects the port 107 with the recess 109 and the pressure port 103.

Thus, when the valve plug is in the position shown in Fig. 5, pressure will be admitted to the upper end of the cylinder 95 and exhausted from the lower end of the same, thereby rotating the sector H downwardly and, as a mold sector 21 would then be in mesh with sector H, upsetting the mold and discharging its contents into the sand box 87. When the valve plug is moved toward the right in Fig. 5 to register the ports 110 and 105, pressure is admitted to the lower end of said cylinder and exhausted from the upper end of the same, thus rotating the sector H upwardly and restoring the mold to its upright, normal position.

The valve plug 108 is moved in the casing 102 by means of studs 113 extending upwardly through slots in the bed A into the path of the slide 39. Thus when the slide 39 reaches the termination of its outward movement, which swings the bar 43 counter-clockwise and rotates the mold table, the plug 108 is moved into the position shown in Fig. 5, thus admitting pressure into the upper end of the cylinder 95 and exhausting the pressure from the lower end of the same, thus rotating the sector H downwardly which causes the mold, whose sector 21 has just come into mesh with the sector H, and whose mold top has just been elevated, to be inverted or upset for the discharge of its contents. When the block 39 reaches the termination of its next, or rearward, movement, it moves the plug 108 toward the right in Fig. 5, thus causing the passage 110 to register with the port 105, admitting pressure to the lower end of the cylinder 95 and exhausting the pressure in the upper end of the same, it causes the sector H to rotate upwardly and righting the mold whose sector 21 is in mesh with said sector H. This righting operation is accomplished before the table is again rotated, so that upon the next movement of the table, the mold is in proper position to receive the gather of glass from the operator's punty.

I provide a pressing base I upon which the molds rest in turn during the pressing operation, thus preventing the pressure exerted by the pressing plunger from straining and tilting the mold table D, and holding the mold in proper position to receive the plunger. Said base is of the following construction:

113 is a circular casting or block vertically mounted on the bed A, beneath the pressing plunger. 114 is a cylindrical sleeve vertically sliding on said casting. 115 is a circular plate mounted on top of said casting, and when said sleeve is depressed, its upper beveled edge is flush with the top surface of said plate. Said casting is provided with an upwardly extending axial bore 116 whose lower end is enlarged to form the piston chamber 117. 118 is a plunger moving in said bore and provided on its lower end with a piston 119. 120 is a horizontal pin fixed in the upper end of said plunger, extending through a diametric slot 121 in the casing, and having its outer ends fixed in holes in the sleeve. 122 is a passage in the casting 113 connected to a pipe 123 and leading into the bottom of the piston chamber 117. The pipe 123 connects with the pipe 81. 124 is a passage in the casting 113 connected to a pipe 125 and leading into the top of the piston chamber. The pipe 125 connects with the pipe 80.

Figures 11, 12, 13, 14, 15, 16, 17:
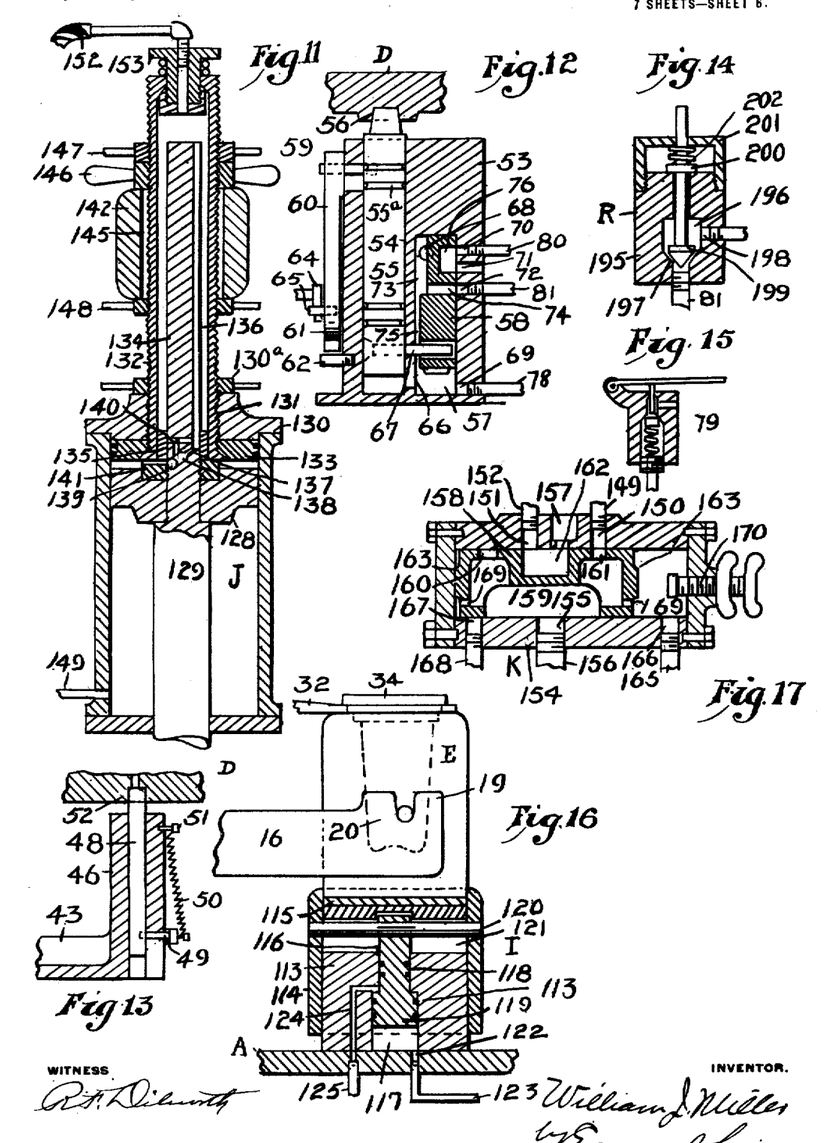
Fig. 11 is an enlarged vertical section through the piston mechanism of the pressing plunger.
Fig. 12 is an enlarged vertical section taken along the line XII—XII in Fig. 6, showing the table locking mechanism.
Fig. 13 is a section of the table rotating mechanism taken along the line XIII—XIII in Fig. 6.
Fig. 14 is a vertical section of the cushion valve shown in elevation in Fig. 4.
Fig. 15 is a vertical section of the control valve shown in elevation in Fig. 4.
Fig. 16 is a vertical section of the mold positioning mechanism with a mold supported thereon for the pressing operation.
Fig. 17 is an enlarged longitudinal and vertical section of the automatic control valve of the pressing cylinder.
Figure 18:
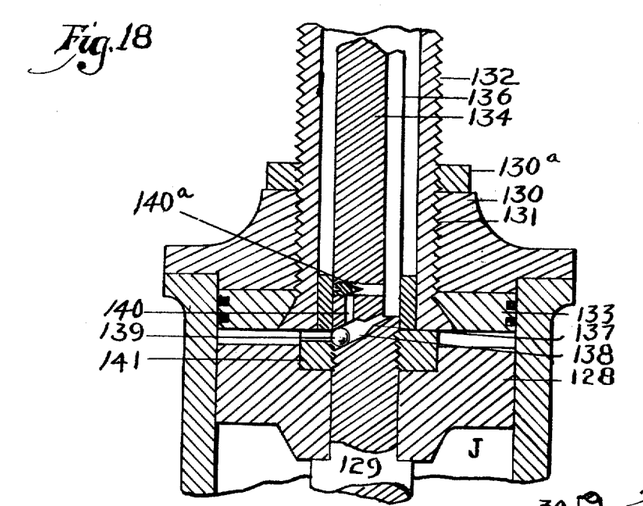
Fig. 18 is an enlarged detail of the structure shown in Fig. 11.
Figure 19:
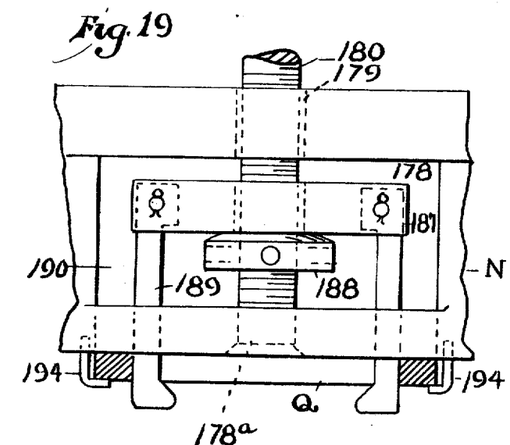
Fig. 19 is an enlarged detail of the pressure plunger mounting shown in Fig. 1.
Figure 20:
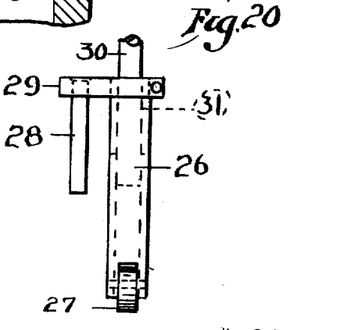
Fig. 20 is a detail, partially in vertical section, showing the stem and guide of the mold top lifting device.
Figure 21:
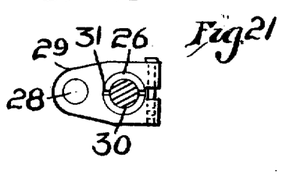
Fig. 21 is a top plan view of the split spring yoke of the same, the stem being shown in section.

The sleeve 114 is of proper internal diameter to slip up over the bottom end of the molds E and the top surface of the plate 115 is somewhat higher than the bottoms of the molds E when they are suspended normally on the mold table D. Thus when a mold is swung around into the pressing position, it rides up over the beveled edge of the depressed sleeve 114 and centers itself on the plate 115, being slightly elevated and thus raising its weight from the arms 17 of the mold table. As explained, simultaneously with the rise of the locking piston 55 to lock the table D stationary, pressure is admitted to the pipe 81 and consequently also to the pipe 123, and the pressure in the pipe 80, and consequently also in the pipe 125, is exhausted, thus elevating the piston 119 and with it the sleeve 114 which then encircles the lower end of the mold, as shown in Fig. 16, and holds it rigidly in proper position for the pressing operation. Further, when the locking piston 55 descends to release the table preparatory to another rotation of the latter, the pipe 81 is relieved of the pressure and the pressure is admitted to the pipe 80, thus depressing the piston 119 and with it the sleeve 114, thus releasing the latter from the mold so that it may move unobstructedly with the table.

J is a vertically disposed pressing cylinder mounted on a cross head 126 which is slidably mounted on the standards B and C. 128 is a piston working in said cylinder whose depending piston rod 129 extends down through the bottom head of the cylinder and through an opening in the cross head 126.

130 is the upper head of the cylinder J and is provided with an axial threaded hole 131 through which extends an externally threaded sleeve 132 which is screwed into said threaded opening to the extent desired. The inner end of the sleeve 132 is provided with a false cylinder head 133 whose perimeter maintains pressure tight contact with the wall of the cylinder J. 130$^a$ is a lock nut which locks the sleeve 132 in its adjusted position in the threaded hole 131.

The piston 128 is provided with a stem 134 which is shown as an extension of the piston rod 129 and which extends up within the sleeve 132 and constitutes an auxiliary guide for the piston. Said stem fits said sleeve loosely but the lower end of said sleeve is provided with a bushing 135 which maintains a snug sliding fit with said stem 134. One side of said stem from its top to a point near its lower end is provided with a longitudinal groove 136 for the free passage of fluid pressure, which groove at its lower end communicates with an inclined passage 137 of small diameter, communicating with the upper interior of the cylinder J. The lower end of said passage is counter-bored to provide a ball valve chamber 138 in which a mounted ball valve 139 is adapted, when in its raised position, to close the lower end of the passage 137. 140 is an adjustable by-pass through which pressure may pass around the ball valve. The capacity of said by-pass is regulated by a screw plug 140$^a$. A collar 141 is provided to prevent the escape of the ball valve from its chamber, and also to clamp the piston 128 rigidly on the piston rod 129.

142 is the top cross head which is fixed on the standards B and C, as by means of split collars 143 and bolts 144. The sleeve 132 extends up through a central opening 145 in said cross head and is suspended therefrom by means of a threaded hand wheel 146 screwed on said sleeve and resting on said cross head. 147 is a locking nut screwed on said sleeve down against the hand wheel 146, while 148 is a similar locking nut screwed on said sleeve up against said cross head. It is evident that by loosening the locking nuts and adjusting the hand wheel 146, the elevation of the sleeve 132 and the cylinder J may be adjusted to suit the requirements of the pressing operation. The locking nuts are then retightened to again rigidly hold the sleeve in position.

Thus the sleeve 132 and the cylinder J may be raised or lowered, and by loosening the lock nut 130$^a$ and adjusting the sleeve in relation to the cylinder, the internal capacity of the cylinder may be adjusted by means of the false head 133. By tightening the lock nut 147 against the hand wheel 146, said hand wheel may be used to turn the sleeve in the cylinder head 130 to adjust the false cylinder head 133 in the cylinder J.

Pressure is admitted to the bottom of the cylinder J through a pipe 149 which connects with a port 150 in the casing of the automatic valve K which is mounted on or adjacent to the base of the cylinder J and moves therewith. In alinement with said port 150 said casing is provided with a similar port 151 which is connected by a flexible and extendible pipe 152 with the swivel nipple 153 fixed on the upper end of the sleeve 132, thus supplying fluid pressure to the interior of said sleeve.

The cylindrical casing 154 of said automatic valve K, best shown in Fig. 17, is provided at one side at its longitudinal center with a pressure inlet port 155 connected by a pipe 156 with the constant pressure supply pipe 77. 157 is a port in the wall of said casing open to atmosphere and preferably located diametrically opposite the inlet port 155. The ports 150 and 151 are located on either side of the port 157 and spaced equally therefrom in the same longitudinal line. 158 is a sliding valve body in said casing. 159 is a recess in said body always in communication with the inlet port 155. 160 and 161 are a pair of transverse passages in said body communicating with the recess 159. Intermediate of said passages, said valve body is provided with a recess 162 which is so positioned that when the passage 161 registers with the port 150, the recess 162 connects the ports 151 and 157, and, when the passage 160 registers with the port 151, said recess connects the ports 150 and 157.

L is a bleeder which is interposed in the path of the bar 43 so as to be actuated by a projection 164 on the latter when the table reaches the limit of its rotation. 165 is a pipe connecting said bleeder L with a port 166 in the end of the valve casing 154 adjacent to the port 150. The opposite end of the casing is provided with a similar port 167 connected by a pipe 168 with the timer M.

169 are small bleeder ports in the ends of the valve body 158 to maintain a slow pressure leakage from the recess 159 into the ends of the valve casing. The limit of movement of the valve body toward the right in Fig. 17 may be adjusted by means of a screw bolt 170 extending through the head of the casing.

The depending piston rod 129 is secured at its lower end, as by pins 171 in a vertical opening in the cross head 172 sliding on the standards B and C. 173 represents brackets extending down from the ends of the cross head 126 on either side of the standards B and C. 174 represents links having their upper ends pivoted to said brackets and having their lower ends pivoted to the outer ends of fulcrum links 175 whose inner ends are pivoted to the cross head 172. 176 are links whose upper ends are pivoted to the juncture between the links 174 and 175 and their lower ends are pivotally connected to the ends of the cross head N which slides on the standards B and C.

177 is a striking rod adjustably mounted on the cross head N, and adapted to engage the piston rod 177ª of the timer M during the upward movement of the cross head to reset the timer.

The cross head N is provided with a transverse horizontal opening 178, and 179 is a circular hole extending down from the top of said cross head, in alinement with the piston rod 129, into the opening 178. 180 is a threaded shaft extending down through said opening and having its lower end screwed into a threaded hole 178ª in the floor of the opening 178. 181 is a cross bar adjustably fixed on the upper end of the shaft 180 by means of upper and lower locking nuts 182. The outer ends of the bar 181 are provided with vertical holes for the downward extension of the headed bolts 183 which extend down through cylindrical sleeves 184 which slide in vertical cylindrical bearings 185 in the cross head N. The lower threaded ends of the bolts are screwed into threaded holes in the spring plate O, thus supporting said spring plate. The upper ends of the sleeves 184 are countersunk, as shown, to seat the lower ends of helical springs 186 which are coiled about the bolts 183 and bear against the cross bar 181, thus tending to resiliently depress the spring plate O below the cross head N.

187 is a horizontal yoke adjustably supported on the shaft 180 by means of the screw collar 188. 189 represents a pair of gripping fingers, pivoted at their upper ends to the ends of the yoke 187 and depending through slots 190 in the bottom of the opening 178. The lower ends of said fingers are provided with inwardly extending hooks which fit under and engage the beveled top flange 191 of the pressing plunger P, thus supporting said plunger in place.

Q is a ring provided with radial handles 192 and internal eccentric cam surfaces 193. The ring Q is rotatably supported below the cross head N by means of depending hanging hooks 194 which permit the ring to be shifted laterally. Thus the ring may be said to be floatably supported from the cross head. The ring Q encircles the upper end of the pressing plunger P and the suspension fingers 189. By turning the ring in the proper direction, the cam surfaces 193 force and lock the fingers into snug supporting engagement with the beveled flange 191 of the pressing plunger. By screwing up the collar 188 on the shaft 180, thus elevating the yoke 187, the upper end of the pressing plunger P is forced up against the bottom surface of the cross head N, thus rigidly connecting the plunger with the cross head. The plunger may be adjusted laterally or horizontally in relation to the cross head by shifting the ring Q before the collar 188 is screwed up to clamp the plunger against the cross head. The plunger may be readjusted in relation to the cross head by screwing the collar 188 down on the shaft 180 and the ring Q and the plunger P may be shifted as desired. A rotation of the ring Q in reverse direction to that previously referred to releases the fingers 189, so that the plunger may be detached.

Before the machine is put into operation for the manufacture of product, a mold is centered under the pressing mechanism and the proper plunger is mounted and adjusted so that it will properly enter the mold in the pressing operation. By means of the mechanism for mounting and adjusting the plunger, just described, any irregularity or lack of alinement in the various elements, such as between the mold table and the pressing mechanism may be allowed for and provided against.

The office of the spring plate O is to resiliently engage the mold top and seat itself thereon as the plunger descends toward the mold, and to lag behind the rising plunger to steady the mold and its contents, and to strip the glass from the emerging plunger.

The alternate depression of the pressing plunger into the pressing position and its subsequent elevation into its inoperative position are accomplished in the following manner.

Assuming the bit to be elevated, in such case the plug 158 of the automatic valve K will have assumed the position shown in Fig. 17 wherein the port 151 is connected by the recess 162 to the exhaust port 157, thus relieving pressure in the sleeve 132 and above the piston 128 in the cylinder J, while the port 150 is connected to the pressure port 155, supplying pressure in the cylinder J under its piston. As the bar 43 completes its stroke forward, thus halting the table D in its next position and causing the same to be locked stationary, the bleeder L is opened by the projection 164 of said bar, thus relieving the pressure in the right end of the valve casing 154, and permitting the pressure which has leaked into the other end of the casing through the small port 169 to throw the valve body 158 toward the right in Fig. 17, thus connecting the ports 151 and 155 through the passage 160 and connecting the ports 150 and 157 by the recess 162. Thus the pressure is relieved from under the piston 128 in the cylinder J and is admitted in the upper end of said cylinder, thus causing said piston to descend in said cylinder.

The volume of fluid admitted to the upper end of the cylinder J, and exhausted from the lower end of the same, through the automatic valve K, may be controlled by adjusting the screw bolt 170, thus permitting the valve body sufficient movement toward the right in Fig. 17 to establish complete or full volume registration between the passage 160 and the port 151, and between the port 150 and the recess 162, or such partial registration of the same, to admit the desired volume of fluid to the upper end of the cylinder J and exhaust the desired volume of fluid from the lower end of said cylinder, thus providing the proper speed and force in the descent of the piston required for the work at hand.

The timer M, which is the subject of my previous issued Letters Patent of the United States 941,935, granted November 30th, 1909, controls the length of the dwell of the plunger in the glass to properly set it, since its descending piston opens the relief valve in the timer at the moment set, thus relieving the pressure in the left end of the valve casing 154 and permitting the pressure in the right end of said casing, which has accumulated since the momentary opening of the bleeder L, which automatically closes as soon as the bar 43 begins its rearward or clockwise movement, to move the valve body 158 toward the left into the position shown in Fig. 17, thus connecting the port 150 with the port 155 through the passage 161 and connecting the port 151 with exhaust through the recess 162. Thus the pressure is exhausted from the upper end of the sleeve 132 and admitted to the lower end of the cylinder J. This results in elevating the piston 128 and thus raising the plunger out of the mold into its retracted position.

The elevation of the plunger is controlled by the timer M and is accomplished before the next rotation of the mold table.

As the plunger and the cross head N rise, the stem 177 engages the piston rod 177$^a$ of the timer and resets the latter for the next pressing operation.

It will be understood that the timer may be set to permit any desired dwell of the plunger in the glass.

As the piston 128, on its upward stroke, approaches the false cylinder head 133, the lower end of the groove 136 is sealed by passing above the bushing 135, and the ball valve 139 is closed by the internal pressure of the cylinder. Thus the only remaining vent for the fluid pressure is the small by-pass 140. By this means the end of the piston stroke is cushioned and a violent contact between the piston and the false cylinder head is prevented. The rate of escape of the fluid pressure through the by-pass 140 may be regulated by the screw plug 140$^a$.

When the pressure is supplied to the upper end of the sleeve 132, the same will be at first admitted to the upper end of the cylinder J through the by-pass 140 and the descent of the piston 128 will be at slow speed until the lower end of the groove 136 in the stem 134 descends below the false cylinder head 133, when said pressure will be admitted to said cylinder to the full capacity of said groove.

The function of the toggle mechanism interposed between the piston rod 129 and the cross head N, to which the pressing plunger P is secured, is as follows:

As said piston descends, the cross head 172 moves downwardly thus gradually straightening out the links 174 and 176 toward their position of vertical alinement. Thus the downward movement of the cross head N and the plunger P is at first relatively rapid but as the links straighten out, the speed of descent becomes progressively slower while the power or force increases. Thus the plunger enters the mold at reduced speed but with greater force to meet the increasing resistance of the glass, whereby the glass is thoroughly distributed over the walls of the mold and the latter is properly "filled." Where the gather of glass is cut under weight, more power is required for filling and as the plunger will in such case enter the mold to a greater degree, such additional force required is furnished by the toggle mechanism. Where the gather is cut over weight, the plunger will of course enter the mold to a less depth and the lesser force required to fill the mold is thus provided. Also the initial ascent of the plunger is at a reduced rate of speed, thus minimizing the disturbance of the glass by the departing plunger and enabling the spring plate to properly strip the glass from the plunger.

By adjusting the toggle mechanism, by properly positioning the cylinder J and the cross head 126, the toggles are arranged to straighten out to a greater or less degree, so that the proper pressing force may be obtained to press various types of articles. Thus a shallow article, for which a relatively shallow mold is used, requires a relatively small force for filling the mold, so that the toggle mechanism would be adjusted so as to straighten out or to approach "the bite" to a lesser degree than when a relatively deep article is to be pressed in a deeper mold where more force is required to properly fill the mold.

Thus my apparatus may be readily adjusted for forming articles of any desired character and depth and the necessary pressing force and speed of movement can be obtained by simple and easy adjustment. Moreover, by means of the toggle mechanism, fluid pressure consumption is conserved, as the piston movement in the cylinder J is multiplied by the toggle mechanism, and accordingly the presser plunger moves faster than the piston. Thus much less power is required than in the case of a directly connected piston rod and plunger. It has been found in practice that to develop the same power in a direct acting cylinder, as in my improvement, such direct acting cylinder would need be from sixteen to sixty-four times the capacity that I require.

A cock 165ᵃ is provided in the bleeder line 165, so that at will the pressing mechanism may be disconnected from the table rotating and other associated mechanism.

To prevent the mold table D from completing its forward movement with a jar as it reaches its locking position, I prefer to provide in the pressure line 81 a cushioning valve R of the following construction: 195 is a block or casting containing a pressure chamber 196 having an outwardly tapered valve seat 197, forming the inner end of a threaded port into which is screwed the end of the pipe 81 leading from the port 72 of the table locking mechanism, while a lateral port 198 is connected to the end of the pipe 81 which leads to the cylinder 37. 199 is a plunger having a tapered head and spring pressed toward said valve seat 197 but prevented from entirely seating in the same by the limiting adjustment of a collar 200 which is in threaded engagement with and encircles the valve stem within the cage 201 and against which the helical spring 202 bears. Thus the escape of pressure from the forward end of the cylinder 37 is retarded by the partial blocking of the valve seat 197, but when pressure is introduced into said cylinder through the pipe 81, the plunger 199 is forced upwardly and the valve seat fully opened.

The coordinated operation of the various described parts of my improved machine, as illustrated in the accompanying drawings, is as follows:

Assuming molds to be positioned under the shearing mechanism, under the pressing mechanism and in juxtaposition to the dumping mechanism, the operator deposits a gather of glass in the mold position under the shearing mechanism and actuates the relief valve 79 by pressing on the lever of the same with his punty. Thus, the pressure is exhausted beneath the slide valve 58 and the table locking piston 55, unlocking the mold table. The descent of the slide valve 58 will result in pressure being admitted to the rear end of the shear cylinder 82 which will result in quickly closing the shears 83 and severing the neck of glass which connects the gather in the mold to the punty. Also pressure will be admitted to rear end of the cylinder 37, thus swinging the bar 43 counter-clockwise and rotating the mold table, so that the mold in which the gather of glass has been deposited will ride up upon and seat itself on the plate 115 of the pressing base I and the sleeve 114 will rise and encircle the lower end of the mold to hold in rigidly in proper alinement with the pressing plunger. As the bar 43 reaches the end of its counterclockwise swing, the lever 64 will release the piston 55, permitting the latter to rise and lock the table stationary, and the projection 164 on the bar 43 will open the bleeder L, thereby introducing pressure into the upper end of the cylinder J and relieving the pressure in the lower end thereof, thus starting the descent of the pressing plunger toward the mold.

Moreover, as the bar 43 reaches the end of its forward swing, the slide 39 throws the valve plug 108, so that pressure is admitted to the upper end of the cylinder 95 and exhausted from the lower end of the same, thus rotating the sector H downwardly and thereby upsetting the mold whose sector 21 has been placed in mesh with said sector and dumping the contents of said mold into the said box 87 which has been previously partially rotated in unison with the mold table D, thus preventing cracking or chipping of the ware by coming into contact with ware previously dumped. As said mold has previously approached the dumping position, its mold top 34 has been elevated out of the way by the cam track 36.

During the pressing operation, while the mold table D remains stationary, the bar 43 swings rearwardly, clockwise, as has already been described, and, at the completion of its rearward stroke, the slide 39 moves the valve plug 108 into position wherein pressure is admitted to the lower end of the cylinder 95 and exhausted from the upper end of the same, thus causing the sector H to rotate upwardly, thereby righting the mold whose contents have been dumped.

When the bar 43 reaches the end of its rearward or clockwise swing, the pin 48 seats in the adjacent hole 52 in the table D, ready to rotate the table and the said box on its next forward swing.

The timer M controls the dwell of the pressing plunger in the mold and causes the same to ascend when the mold has been filled and the glass article completed.

In the meantime, the operator has inserted his punty in the pot or tank of molten glass and accumulated a second gather which at the proper moment he places in the mold and actuates the relief valve 79, repeating the operation just described. As the mold, which has been just dumped and righted by the sector H, swings around toward the operator, the corresponding roller 27 passes off of the track 36, allowing the mold top 34 to descend and seat itself on the top of the mold in position for the gathering and pressing operation.

It is of course evident that mechanically operated or automatic gathering means may be substituted for the operator and his punty for placing the glass in the molds and actuating the valve 79.

Although, for the sake of clearness, I have minutely described the embodiment of my invention shown in the drawings, I do not wish to limit myself thereby, but claim broadly:—

1. In a machine of the character described, a fluid pressure cylinder, a false head in said cylinder, a sleeve connected to said false head and extending up through the upper head of said cylinder, a piston in said cylinder, a piston rod extending down from said piston through the lower head of said cylinder, a pressing element operatively connected to the lower end of said piston rod, a stem connected to said piston and extending up into said sleeve, and means for supplying fluid pressure to the lower end of said cylinder and to the upper end of said sleeve.

2. In a machine of the character described, a fluid pressure cylinder, a false head in said cylinder, a sleeve connected to said false head and extending up through the upper head of said cylinder, a piston in said cylinder, a piston rod connected to said piston and extending down through the lower head of said cylinder, a pressing element operatively connected to the lower end of said piston rod, a stem connected to said piston and extending up into said sleeve, an automatic control valve, and fluid connections between said valve and the lower end of said cylinder and the upper end of said sleeve whereby fluid pressure may be alternately admitted to either side of said piston.

3. In a machine for pressing articles of glass, the combination of vertical supporting guides, a fluid pressure cylinder mounted on the upper ends of said guides, a piston working vertically in said cylinder, a piston rod depending through the lower end of said cylinder; a slide mounted on said guides, a pressing plunger depending from said slide, pairs of toggle levers connecting said slide with the upper portion of said guides, and links connecting the lower end of said piston rod with the joints of said toggle levers, whereby the descent of said piston tends to straighten out said toggle levers with said links approaching a position at right angles to said toggle levers and the pressing plunger is depressed, while the ascent of said piston tends to fold up said toggle levers with the links approaching parallelism with said toggle levers and the pressing plunger is elevated, substantially as described.

4. In a machine for pressing articles of glass, the combination of vertical supporting guides, a fluid pressure cylinder mounted in the upper ends of said guides, a piston working vertically in said cylinder, a piston rod depending through the lower end of said cylinder, a slide mounted on said guides and attached to the lower end of said piston rod, a second slide mounted on said guides below said first named slide, a pressing plunger depending from said second named slide, pairs of toggle levers connecting said second named slide with the upper portion of said guides, and links connecting the joints of said toggle levers with said first named slide, whereby as the piston descends the toggle levers are straightened out and the pressing plunger is depressed, said links tending to assume a position at right angles to said toggle levers, while as the piston ascends the toggle levers are folded up and the pressing plunger is elevated, said links tending to assume a position of parallelism with said toggle levers, substantially as described.

5. In a machine for pressing articles of glass, the combination of vertical supporting guides, a fluid pressure cylinder adjustably mounted on said guides so as to be elevated or lowered in relation to said guides, a piston working vertically in said cylinder, a piston rod depending through the lower end of said cylinder, a slide mounted on said guides, a pressing plunger depending from said slide, pairs of toggle levers connecting said slide with the mounting of said cylinder, and links connecting the lower end of said piston rod with the joints of said toggle levers whereby the descent of said piston will tend to straighten out said toggle levers and depress said pressing plunger while the ascent of said piston will tend to fold up said toggle levers and elevate said pressing plunger, and the degree to which said toggle levers are straightened out can be regulated by adjusting the elevation of said cylinder, substantially as described.

6. In a machine for pressing articles of glass, the combination of a support, a hollow sleeve depending from said support, a fluid pressure cylinder mounted on the lower end of said sleeve, the bore of said sleeve communicating with the interior of said cylinder, a piston working in said cylinder, a piston rod depending through the lower end of said cylinder, a pressing plunger actuated by said piston rod, and a guide stem attached to said piston and working in said sleeve.

7. In a machine for pressing articles of glass, the combination of a support, a hollow sleeve depending from said support, a fluid pressure cylinder mounted on the lower end of said sleeve, the bore of said sleeve communicating with the interior of said cylinder and forming an exhaust passage for the upper end of said cylinder, a piston working in said cylinder, a piston rod depending through the lower end of said cylinder, and a pressing plunger actuated by said piston rod.

8. In a machine for pressing articles of glass, the combination of a support, a hollow sleeve depending from said support, a fluid pressure cylinder mounted on the lower end of said sleeve, the bore of said sleeve communicating with the interior of said cylinder, a piston working in said cylinder, a piston rod depending through the lower end of said cylinder, and a pressing plunger actuated by said piston rod.

9. In a machine for pressing articles of glass, the combination of a support, a vertically disposed fluid pressure cylinder mounted on said support, an automatic valve controlling the admission of fluid pressure into and the exhausting the same from the ends of said cylinder, a piston working in said cylinder, a piston rod depending through the lower end of said cylinder, a pressing plunger actuated by said piston rod, and means for adjusting the elevation of said cylinder relative to said support whereby the movement of said pressing plunger may be regulated.

10. In a glass pressing machine, a support, a hollow member depending from said support, a cylinder mounted on the lower end of said member and communicating with the interior thereof, and fluid pressure connections for the upper end of said member and the lower end of said cylinder.

11. In a glass pressing machine, a support, a hollow member depending from said support, a cylinder adjustably mounted on the lower end of said member and communicating with the interior of the same, and fluid pressure connections for the upper end of said member and the lower end of said cylinder.

12. In a glass pressing machine, a support, a hollow member depending from said support and adjustable in relation thereto, a fluid pressure cylinder mounted on the lower end of said member and communicating with the interior thereof, and fluid pressure connections for the upper end of said member and the lower end of said cylinder.

13. In a glass pressing machine, a support, a hollow member depending from said support and adjustable in relation thereto, a cylinder adjustably mounted on the lower end of said member and communicating with the interior of the same, and fluid pressure connections for the upper end of said member and the lower end of said cylinder.

14. In a glass pressing machine, a support, an exteriorly threaded sleeve depending from said support, a fluid pressure cylinder having its upper head screwed onto said sleeve, and a false cylinder head mounted on the lower end of said sleeve within said cylinder.

15. In a glass pressing machine, a support, an exteriorly threaded sleeve depending from said support and adjustable in relation thereto, a fluid pressure cylinder having its upper head screwed onto said sleeve, and a false cylinder head mounted on the lower end of said sleeve within said cylinder.

Signed at Pittsburgh, Penna., this 31st day of July, 1917.

WILLIAM J. MILLER.

Copies of this patent may be obtained for five cents each, by addressing the "Commissioner of Patents, Washington, D. C."